United States Patent [19]
Small, Jr. et al.

[11] Patent Number: 5,194,523

[45] Date of Patent: Mar. 16, 1993

[54] POLYESTER/POLYCARBONATE BLENDS HAVING IMPROVED CLARITY AND IMPACT STRENGTH

[75] Inventors: James D. Small, Jr., Blountville; Robert W. Seymour; Thomas E. Flora, both of Kingsport, all of Tenn.

[73] Assignee: Eastman Kodak Company, Rochester, N.Y.

[21] Appl. No.: 707,474

[22] Filed: May 30, 1991

Related U.S. Application Data

[63] Continuation-in-part of Ser. No. 458,016, Dec. 28, 1989, abandoned.

[51] Int. Cl.$^5$ .................. C08L 67/02; C08L 69/00
[52] U.S. Cl. ............................... 525/439; 525/466
[58] Field of Search .................................... 525/439

[56] References Cited

U.S. PATENT DOCUMENTS

| | | | |
|---|---|---|---|
| 4,188,314 | 2/1980 | Fox et al. | 260/37 PC |
| 4,391,954 | 7/1983 | Scott | 525/439 |
| 4,559,388 | 12/1985 | Liu et al. | 525/146 |
| 4,786,692 | 11/1988 | Allen et al. | 525/439 |

FOREIGN PATENT DOCUMENTS

| | | |
|---|---|---|
| 0111810 | 6/1984 | European Pat. Off. . |
| 1559230 | 1/1980 | United Kingdom . |

OTHER PUBLICATIONS

Research Disclosure 22921, "Compatible Polyester/Polycarbonate Blends", May 1983.

R. N. Mohn, D. R. Paul, J. W. Barlow, and C. A. Cruz, "Polyester-Polycarbonate Blends. III. Polyesters Based on 1,4-Cyclohexanedimethanol/Terephthalic Acid-/Isophthalic Acid," *Journal of Applied Polymer Science,* vol. 23, 1979, pp. 575-587.

E. V. Gouinlock, R. A. Wolfe, and J. C. Rosenfeld, "Copolyester Sequence Distribution by 60, 100, and 220 MHz PMR", *Journal of Applied Polymer Science,* vol. 20, 1976, pp. 949-958.

J. Devaux, P. Godard, and J. P. Mercier, "Bisphenol-A Polycarbonate-Poly(butylene Terephthalate) Transesterification. II Structure Analysis of the Reaction Products by IR and $^1$H and $^{13}$CNMR," *Journal of Polymer Science: Polymer Physics Edition,* vol. 20, 1982, 1881-1894.

Elastomerics, May 1977, "Antioxidants in Compounding", C. R. Parks and R. B. Spacht.

*Primary Examiner*—Patricia A. Short
*Attorney, Agent, or Firm*—John F. Stevens; William P. Heath, Jr.

[57] ABSTRACT

Disclosed are clear thermoplastic molding compositions comprising an aromatic polycarbonate, a polyester of terephthalic acid and 1,4-cyclohexanedimethanol, and the copolymeric transesterification product of the polycarbonate and polyester.

5 Claims, No Drawings

POLYESTER/POLYCARBONATE BLENDS HAVING IMPROVED CLARITY AND IMPACT STRENGTH

This application is a continuation-in part of our copending application No. 07/458,016 filed Dec. 28,1989, now abandoned.

TECHNICAL FIELD

The present invention relates to polyester/polycarbonate blends having improved clarity and impact strength. The blends comprise the transesterification product of polyester and polycarbonate.

BACKGROUND OF THE INVENTION

Polycarbonate is a useful engineering plastic for parts requiring clarity, high toughness, and, in some cases, good heat resistance. However, polycarbonate also has some important deficiencies, among them poor chemical and stress crack resistance, poor resistance to sterilization by gamma radiation, and poor processability. One method to improve these properties is to blend polycarbonate with another resin, a useful family of such resins being the thermoplastic polyesters. This invention relates to a blend comprised of poly(1,4-cyclohexylenedimethylene terephthalate)[referred to herein sometimes as "Polyester C"], bisphenol A polycarbonate, and copolymers of this polyester and polycarbonate which have surprisingly good low temperature toughness compared to known polyester/polycarbonate blends. In addition, the processability, chemical resistance, and radiation resistance of the polycarbonate are also improved.

Research Disclosure 22921, May, 1983, concerns blends of polycarbonate with copolyesters based on terephthalic acid and a mixture of 1,4-cyclohexanedimethanol and ethylene glycol. Similar blends are disclosed in U.S. Pat. No. 4,786,692. Blends of polycarbonate with another family of copolyesters, those based on a mixture of terephthalic and isophthalic acids with 1,4-cyclohexanedimethanol, are disclosed in U.S. Pat. Nos. 4,188,314 and 4,391,954. British Patent Specification 1,599,230 (published Jan. 16, 1980) discloses blends of polycarbonate with polyesters of 1,4-cyclohexanedimethanol and a hexacarbocyclic dicarboxylic acid. Mohn et al. reported on thermal properties of blends of polyesters based on 1,4-cyclohexanedimethanol and terephthalic acid or terephthalic/isophthalic acid mixtures with polycarbonate [*J. Appl. Polym. Sci.*, 23, 575 (1979)], concluding that there were only slight differences in behavior between the two systems, and that these results were not unexpected. This is the first known disclosure of blends of Polyester C and polycarbonate. These blends, however, were strictly two component blends of the polycarbonate and Polyester C, due to the fact that the authors added one percent of the antioxidant N,N'-di-2-naphthyl-p-phenylenediamine to the system. This antioxidant has been identified not only for its utility as an antioxidant, but also for its metal deactivating capability. Parks and Spacht *Elastomerics*, May, 25–34, (1977)], throughout their review, address the effectiveness of p-phenylenediamines as metal deactivators, and specifically label N,N'-di-β-naphthyl-p-phenylenediamine as a metal deactivator. Deactivation of the residual metal catalyst present in the polyester hinders the reactions that are required to form the desired copolymeric components. Thus, the compositions made by Mohn et al. were not the three component blends disclosed in the instant invention. Applicants have found that when the copolymeric components, which can be formed by transesterification or other means, are present certain physical properties of the blend are surprisingly improved.

U.S. Pat. No. 4,452,933 indicates that estercarbonate interchange in blends of poly(tetramethylene terephthalate) and polycarbonate is inhibited by addition of a hydroxy or amino substituted carboxylic acid derivative. The author further alludes that the class of inhibitors should prevent transesterification in other polyester/polycarbonate systems. The fact that polyesters and polycarbonates can undergo estercarbonate interchange is well known, but the present invention discloses unexpected benefits in mechanical properties of a tricomponent blend of polycarbonate, polyester, and the copolymeric products.

In British Patent Specification 1,599,230, blends of polycarbonate with polyesters of 1,4-cyclohexanedimethanol and a hexacarbocyclic dicarboxylic acid were disclosed. They also reported no significant differences in the polyester/polycarbonate blends that were claimed. Further, no indication of the addition to the blend of or the formation in situ of any copolymeric adducts was reported.

The present invention is a new thermoplastic composition comprised of Polyester C, bisphenol A polycarbonate, and copolymeric reaction products of Polyester C and polycarbonate. The term "copolymeric reaction products" is taken to include any method of forming copolymers of Polyester C and polycarbonate such as in situ transesterification, transesterification in a separate step, or direct copolymerization of the monomers, and the like. In their unmodified forms, the blends of this invention are clear. This, combined with their excellent impact strengths, make them useful in ophthalmic and safety shield applications. Additional applications include medical parts, appliance parts, and housings.

DESCRIPTION OF THE INVENTION

According to the present invention, there is provided a clear thermoplastic molding composition comprising a compatible blend of (a) about 10–90% by weight aromatic polycarbonate,
(b) about 10–90% by weight polyester consisting essentially of repeat units from terephthalic acid and 1,4-cyclohexanedimethanol, and
(c) about 1–50%, preferably about 1–20%, by weight of the copolymeric reaction products of (a) and (b), wherein the total of (a), (b) and (c) is 100%.

The polycarbonate consists of the polycarbonate of 4,4'-isopropylidenediphenol (bisphenol A). The R.V. (relative viscosity) of the polycarbonate is 1.1–1.5. The polycarbonate portion of the blends is prepared in the melt, in solution, or by interfacial polymerization techniques well known in the art.

Many such polycarbonates are commercially available, and are normally made by reacting bisphenol A with phosgene, dibutyl carbonate, diphenyl carbonate, etc.

The polyester portion of the molding compositions of the present invention is prepared by conventional polycondensation procedures well known in the art. Conventional catalysts such as, for example, tin or titanium are generally used in amounts of about 10–300 ppm of the polymer. These catalysts remain in the polymer. The polyester, poly(1,4-cyclohexylene dimethylene terephthalate) contains repeat units from a dicarboxylic acid component and a glycol component. The dicarboxylic acid component, a total of 100 mol %, consists essentially of terephthalic acid and the glycol component, a total of 100 mol %, consists essentially of 1,4-cyclohexanedimethanol.

The polyesters can be prepared by direct condensation of the acid with the glycol or ester interchange using a lower alkyl ester such as dimethyl terephthalate. The essential components of the polyester, e.g., terephthalic acid or dimethyl terephthalate and 1,4-cyclohexanedimethanol, are commercially available.

The polyesters described above should have an I.V. (inherent viscosity) of from about 0.4 to about 1.2.

The copolymeric reaction products of the polycarbonate and polyester can be any combination of terephthalic acid (TPA), polycarbonate (PC), or 1,4-cyclohexanedimethanol (CHDM) repeat units as defined below, linked to any combination of TPA, PC, or CHDM by either an ether [—O—]or a carbonate [—OCO$_2$—] unit.

Repeat Units

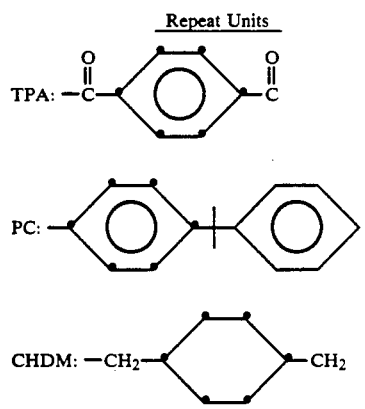

The transesterification reaction can be schematically represented as follows:

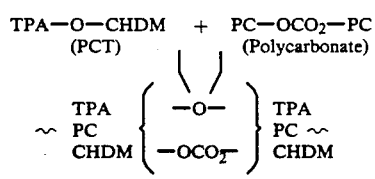

For each transesterification reaction that occurs, a new unit in the polymer chain is formed as defined by the reaction scheme. The residual catalyst used in forming the polyester acts as catalyst for transesterification. As the transesterification process proceeds, these same products are formed randomly along the polymer chain again in any combination previously discussed. It should be apparent that there are a large number of possible combinations of repeat units in the transesterification reaction products.

The transesterification reaction (i.e., the degree of transesterification) can be monitored by using conventional nuclear magnetic resonance (NMR) techniques. By using the analytical method, the average number of units formed, via the transesterification process, per chain can be determined.

Various NMR spectroscopy techniques are known in the art for measuring the amount of transesterification. Among them are the following articles:
E. V. Gouinlock, R. A. Wolfe, J. C. Rosenfeld, *J. Appl. Polym. Sci.*, 20, 949–958, (1976)
J. Devaux, et. al. *J. Polym. Sci.*, Polym. Phys. Ed. 20, 1881–1894, (1982)

Transesterification of the polyester and polycarbonate can be carried out by mixing them at a temperature of 290°–325° C. for a time sufficient to attain the desired transesterification reaction product, generally about 1–10 minutes. Of course, it should be understood that the reaction time is dependent upon the temperature, residual catalyst level, and the reactants' inherent viscosities.

The blends may be made by melt compounding the components, for example, in a single or twin screw extruder. The copolymeric components can be produced in the molten state, either separately from the blend and then subsequently added to the polyester/polycarbonate premix prior to blending or, given sufficient exposure to processing conditions in the presence of active residual polyester polymerization catalyst(s), in situ. (Melt temperatures typically will be in the range of 295°–315° C.; it is desirable that they not exceed 325° C. Of course it is understood that the copolymeric components of this invention can be prepared by alternative methods such as solid phase ester carbonate interchange reactions and then subsequently added to the polyester/polycarbonate premix prior to blending. The range of composition of the blends is from about 10 to about 90 wt % Polyester C and from about 1 to about 50 wt % copolymeric components, with the remaining composition being comprised of polycarbonate. The preferred compositional range is from about 40 to about 60 wt % Polyester C and from about 1 to about 20 wt % Polyester C/polycarbonate copolymeric components. The composition may also contain other additives such as impact modifiers, colorants, stabilizers, processing aids, flame retardants, fillers, and the like. However, it should be noted that catalyst deactivators should not be added prior to the transesterification reaction, but can be added after transesterification if desired.

The following examples are submitted for a better understanding of the invention.

EXAMPLE 1 (Control)

A 50/50 blend of Merlon M40 polycarbonate (a product of Mobay Chemical Corp.) with Polyester A (a copolyester having repeat units from 100 mol % terephthalic acid, about 70–85 mol % 1,4-cyclohexane-dimethanol and about 30–15 mol % ethylene glycol), I.V.=0.75, is prepared. The properties are shown in Table 1.

EXAMPLE 2 (Control)

A similar blend is prepared from Merlon M40 poyycarbonate with Polyester B, a copolyester having repeat units from 100 mol % 1,4-cyclohexanedimethanol with a mixture of about 85 mol % terephthalic and about 15 mol % isophthalic acids. The properties are also shown in Table 1.

EXAMPLE 3

Two 50/50 blends of Makrolon 2600 polycarbonate (a product of Mobay Chemical Corp.) and Polyester C are similarly prepared. A blend consisting of 50% Makrolon 2600 polycarbonate, 49.75% Polyester C, and 0.25% Weston 619 stabilizer (a product of General Electric) was also prepared. Weston 619 is a distearyl pentaerythritol diphosphite compound commonly used as a melt stabilizer that acts to reduce the activity of the residual catalyst in the Polyester C. All blends are prepared as previously outlined, allowing for sufficient residence time for the necessary transesterification reactions to occur at the given processing temperature. As evidenced in Table 2, the 50/50 Polyester C/polycarbonate premix undergoes transesterification reactions during the melt processing, forming in situ 7 and 14% by weight Polyester C/polycarbonate copolymeric components respectively as determined by NMR spectroscopy. At similar processing conditions, the blend containing Weston 619 is similarly shown to contain no copolymeric components. All of the blends prepared in Examples 1, 2, and 3 display high notched Izod impact strengths at 23° C., but, unexpectedly, the value at 0° C. remains high for only the Polyester C/polycarbonate blends containing at least some copolymeric fraction.

EXAMPLE 4

The blends of Table 3 are made from Polyester C, I.V.=0.77, and Merlon M40 polycarbonate, and demonstrate that across the entire composition range unexpectedly high values of the notched Izod impact strength at low temperatures (0° C.) are obtained. In addition, the compositions have a useful balance of other properties (modulus, tensile strength, and heat deflection temperature).

EXAMPLE 5 (Comparative)

Blend A (Control), a 50/50 blend of Makrolon 2600 polycarbonate and Polyester C is again similarly prepared. Blend B contains the same polymeric components, but in addition, 1% of N,N'-di-β-naphthyl-p-phenylenediamine (Agerite White, a product of B. F. Goodrich Chemical Company) was added to the admixture prior to melt compounding. In Case 1, blends A and B were each melt mixed and extruded at approximately 350° C., an extremely high processing temperature which should increase transesterification reaction rates, under typical processing throughput rates. In Case 2, blends A and B were each melted in the extruder and then held at approximately 350° C. for an additional 3 minutes to allow further reaction to occur. After the allotted time at temperature, the blends were extruded and samples were collected and tested for extent of transesterification reaction. As the data in Table 4 indicate, blend A contained 4.1 and 25% of the Polyester C/polycarbonate copolymeric components for Case 1 and Case 2, respectively. Conversely, blend B, containing the p-phenylenediamine additive, showed no evidence of any ester carbonate interchange for either Case 1 or Case 2. Therefore, in the work by Mohn et al. previously cited, the authors unknowingly deactivated the residual catalyst in the polyester and thus could not have produced the desired copolymeric components during their study.

TABLE 1

|  | Polycarbonate/ Polyester A | Polycarbonate/ Polyester B |
| --- | --- | --- |
| Notched Izod Impact Strength, (ft-lb/in.) | | |
| 23° C. | 24 | 17 |
| 0° C. | 5 | 2.4 |
| Tensile Strength at Yield, (psi) | 7700 | 8100 |
| Tensile Strength at Break, (psi) | 7040 | 7500 |
| Elongation at Break, (%) | 98 | 115 |
| Flexural Modulus, (psi) | 304,000 | 313,000 |
| Flexural Strength, (psi) | 12,700 | 13,200 |
| Heat Deflection Temperature, (°C.) | 105 | 106 |

TABLE 2

|  | Polyester C/ Polycarbonate | Polyester C/ Polycarbonate | Polyester C/ Polycarbonate/ Weston 619 Stabilizer |
| --- | --- | --- | --- |
| Notched Izod Impact, (ft-lb/in.) | | | |
| 23° C. | 18 | 18 | 18 |
| 0° C. | 16 | 18.6 | 2.6 |
| Tensile Strength at Yield (psi) | 8100 | 7800 | 8100 |
| Tensile Strength at Break (psi) | 7700 | 8400 | 7600 |
| Elongation at Break (%) | 107 | 126 | 97 |
| Heat Deflection Temperature (°C.) | 94 | 94 | 87 |
| Concentration of Polyester C/ PC Copolymers (%) | 14 | 7 | 0 |

TABLE 3

| | Percent Polycarbonate | | | | | | | | |
| --- | --- | --- | --- | --- | --- | --- | --- | --- | --- |
|  | 10 | 20 | 30 | 40 | 50 | 60 | 70 | 80 | 90 |
| Notched Izod, (ft-lb/in.) | | | | | | | | | |
| 23° C. | 27 | 21 | 20 | 20 | 21 | 19 | 19 | 18 | 19 |
| 0° C. | 23 | 22 | 17 | 20 | 17 | 19 | 19 | 18 | 19 |
| Tensile Str. at Yld. (psi) | 6200 | 6400 | 6800 | 7400 | 7600 | 7900 | 8200 | 8600 | 8700 |
| Tensile Str. at Brk. (psi) | 6900 | 6900 | 6100 | 7600 | 6100 | 6700 | 6200 | 7000 | 7600 |
| Elongation (%) | 176 | 147 | 98 | 133 | 50 | 65 | 12 | 33 | 38 |
| Flexural Modulus (psi) | 235,000 | 241,000 | 248,000 | 271,000 | 281,000 | 287,000 | 306,000 | 312,000 | 336,000 |
| Flexural Strength (psi) | 9520 | 9800 | 10540 | 11340 | 11620 | 12060 | 12500 | 13020 | 13570 |
| HDT at 66 psi (°C.) | 84 | 88 | 94 | 101 | 106 | 111 | 120 | 124 | 132 |

TABLE 4

|  | Blend A | | Blend B | |
| --- | --- | --- | --- | --- |
|  | Case 1 | Case 2 | Case 1 | Case 2 |
| Concentration of Polyester C/ PC Copolymers (%) | 4.1 | 25.0 | 0 | 0 |

As used herein, the inherent viscosity (I.V.) of the polyester is measured at 25° C. using 0.50 g of polymer per 100 mL of a solvent consisting of 60% by weight phenol and 40% by weight tetrachloroethane.

The relative viscosity (R.V.) of the polycarbonate is measured at 25° C. using 0.50 g of polymer per 100 mL of a solvent consisting of methylene chloride.

The following tests are used herein:

Flexural Modulus: ASTM D790
Flexural Strength: ASTM D790
Tensile Strength: ASTM D638
Elongation: ASTM D638
Izod Impact Strength: ASTM D256
Heat Distortion Temperature: ASTM D648

Unless otherwise indicated, all parts, percentages, ratios, etc. are by weight.

The invention has been described in detail with particular reference to preferred embodiments thereof, but it will be understood that variations and modifications can be affected within the spirit and scope of the invention.

We claim:

1. A thermoplastic molding composition comprising a compatible blend of
   (a) about 10-90% by weight aromatic polycarbonate,
   (b) about 10-90% by weight polyester consisting essentially of repeat units from terephthalic acid and 1,4-cyclohexanedimethanol, and
   (c) about 1-50% by weight of the copolymeric reaction products of (a) and (b) wherein (a), (b) and (c) total 100% of the blend,
   the composition when consisting only of (a), (b) and (c) being clear.

2. A molding composition according to claim 1 wherein the R.V. of the polycarbonate is about 1.1-1.5 and the I.V. of the polyester is about 0.4-1.2.

3. A molding composition according to claim 1 comprising about 40-60% by weight polycarbonate, about 40-60% by weight polyester and about 1-20% by weight of said copolymer, the total of said polycarbonate, polyester and copolymer being 100%.

4. A molding composition according to claim 1 wherein said polyester and polycarbonate are reacted by mixing at a temperature of about 290°-325° C.

5. A thermoplastic molding composition produced by mixing in the presence of an active esterification catalyst about 10-90 weight % polyester consisting essentially of repeat units from terephthalic acid and 1,4-cyclohexanedimethanol, and about 90-10 wt % aromatic polycarbonate under reaction conditions such that transesterification occurs between the polyester moietis and polycarbonate moieties to the extent that about 1-50% of copolymeric reaction product is formed.

* * * * *